United States Patent [19]
Orzel et al.

[11] Patent Number: 5,522,219
[45] Date of Patent: Jun. 4, 1996

[54] EXHAUST SYSTEM WITH BYPASS CATALYTIC CONVERTER AND DIAGNOSTICS

[75] Inventors: Daniel V. Orzel, Westland; Glenn A. Zimlich, Dearborn Heights, both of Mich.

[73] Assignee: Ford Motor Company, Dearborn, Mich.

[21] Appl. No.: 522,004

[22] Filed: Aug. 31, 1995

[51] Int. Cl.[6] ....................................................... F01N 3/20
[52] U.S. Cl. ........................... 60/274; 60/276; 60/277; 60/288
[58] Field of Search ............................ 60/274, 276, 277, 60/288

[56] References Cited

FOREIGN PATENT DOCUMENTS 6159044   6/1994   Japan ........................................ 60/277

*Primary Examiner*—Douglas Hart
*Attorney, Agent, or Firm*—Allan J. Lippa; Roger L. May

[57] ABSTRACT

An emission control system including an auxiliary catalytic converter (50) coupled upstream of a main catalytic converter (44) via a bypass valve (52). Exhaust gas flow is first routed through the auxiliary converter (50) by opening one bypass valve (52) and closing another (48) when an indication of exhaust gas temperature is above a predetermined temperature. An indicating signal is derived from transitions in output of an exhaust gas sensor (58) position downstream of the auxiliary converter (50). Degraded operation of the auxiliary converter (50) is provided when both the indicating signal indicates degraded operation and an indication of inducted airflow exceeds a preselected airflow (324). Degraded operation of one bypass valve (48) is provided when the indicating signal indicates degraded operation and the inducted airflow is below the preselected airflow (340–354).

12 Claims, 5 Drawing Sheets

1

EXHAUST SYSTEM WITH BYPASS CATALYTIC CONVERTER AND DIAGNOSTICS

FIELD OF THE INVENTION

The field of invention relates to engine emission systems and performance monitoring of such emission systems.

BACKGROUND OF THE INVENTION

Typical engine emission systems maintain engine air/fuel operation within the peak efficiency window of a catalytic converter. Generally, engine air/fuel ratio is adjusted in response to exhaust gas oxygen sensors positioned both upstream and downstream of a catalytic converter such as shown in U.S. Pat. No. 5,115,639. It is also known to monitor the performance of the converter by comparing a ratio in transitions of the downstream sensor output to the upstream sensor output.

The inventors herein have recognized numerous problems with the above approaches when exhaust gases are routed through an auxiliary converter of lower mass via a bypass solenoid valve. These systems are used to more rapidly warm the auxiliary converter thereby achieving more rapid catalytic action during cold engine starts. Prior performance monitoring systems could not provide complete diagnostic monitoring of the auxiliary converter and bypass valve. Nor could such systems determine whether degraded operation resulted from the converters or from the bypass valve.

SUMMARY OF THE INVENTION

An object of the invention herein is to provide monitoring of an auxiliary catalytic converter and bypass valve during engine operation.

The above object is achieved, and problems of prior approaches overcome, by providing both a control system and control method for engine exhaust gas purification and monitoring of the emission system. In one particular aspect of the invention, the control system comprises the steps of: enabling flow of the exhaust gas through a first catalytic converter via a valve when an indication of exhaust gas temperature is above a predetermined temperature and enabling flow of the exhaust gas through a second catalytic converter when the exhaust gas temperature is below the predetermined temperature; deriving an indicating signal from transitions in output of an exhaust gas oxygen sensor positioned downstream of the second converter; indicating degraded operation of the second converter when both the indicating signal indicates degraded operation and an indication of airflow inducted into the engine exceeds a preselected airflow; and indicating degraded performance of the valve when the indicating signal indicates degraded operation and an indication of inducted airflow is below the preselected airflow.

An advantage of the above aspect of the invention is that onboard, real time, monitoring of the efficiency of the auxiliary catalytic converter is provided in addition to monitoring of the bypass valve.

BRIEF DESCRIPTION OF THE DRAWINGS

The object and advantages of the invention described above will be more clearly understood by reading an example of an embodiment in which the invention is used to advantage with reference to the attached drawings wherein.

DESCRIPTION OF AN EMBODIMENT

Figure 1:
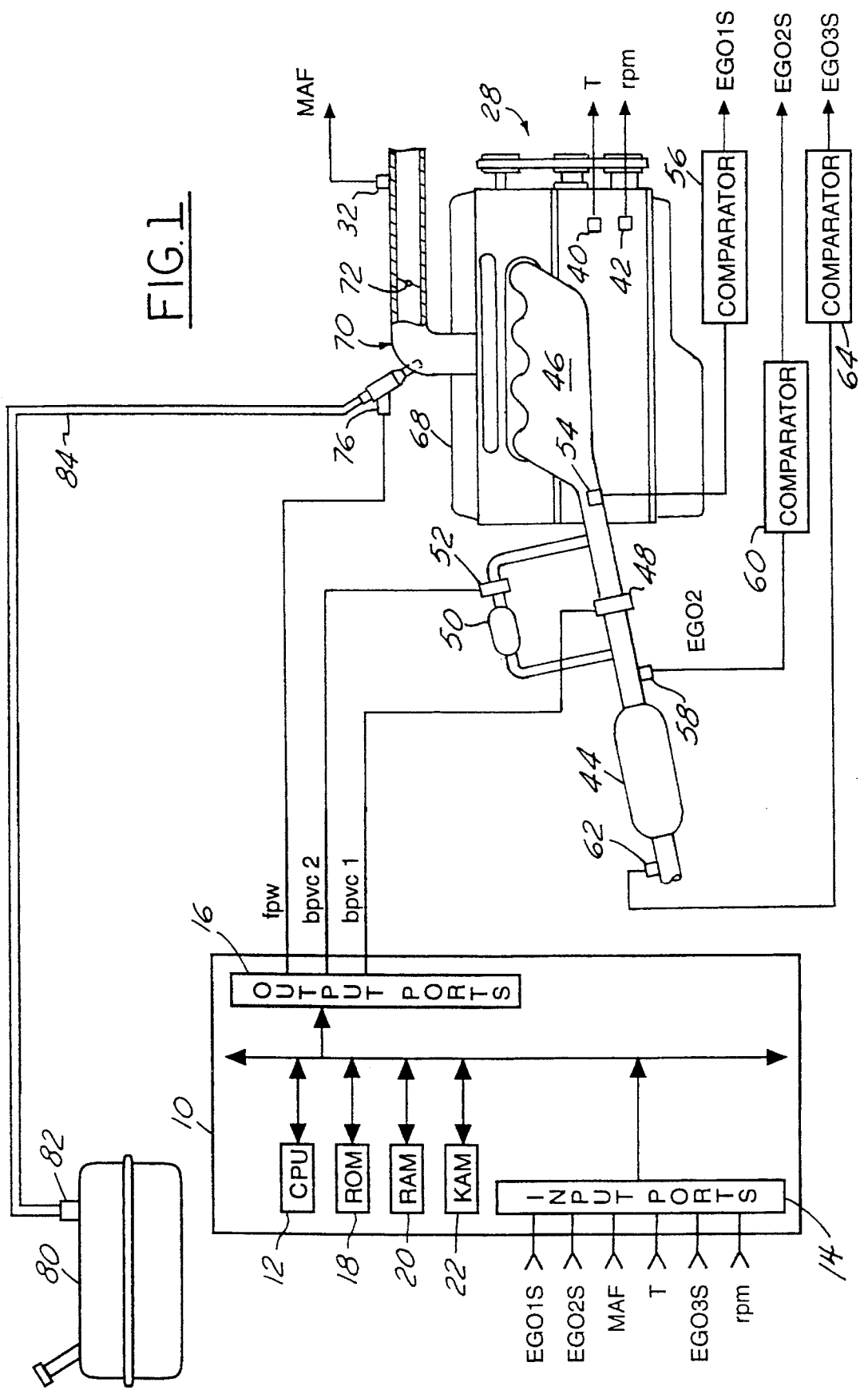
FIG. 1 is a block diagram of an embodiment where the invention is used to advantage.

Controller 10 is shown in the block diagram of FIG. 1 as a conventional microcomputer including: microprocessor unit 12; input ports 14; output ports 16; an electronic storage device or chip, shown as electronically programmable memory 18 in this particular example, for storing the control program; random access memory 20 for temporary data storage which may also be used for counters or timers; keep-alive memory 22, for storing learned values; and a conventional data bus. Controller 10 is shown receiving various signals from sensors coupled to engine 28 including; measurement of inducted mass airflow (MAF) from mass airflow sensor 32; engine coolant temperature (T) from temperature sensor 40; and indication of engine speed (rpm) from tachometer 42.

Catalytic converter 44, a conventional three-way catalytic converter in this particular example, is shown having its inlet coupled to exhaust manifold 46 via electrically controlled solenoid valve 48. Catalytic converter 50 is shown having its inlet coupled to exhaust manifold 46 via electrically controlled solenoid valve 52 and having its outlet coupled to the inlet of converter 44 downstream of valve 48. In this particular example, converter 50 is a conventional three-way catalytic converter having significantly less mass than converter 44. As described in greater detail later herein, converter 50 is used during cold engine operation because its lower mass allows faster warm-up and accordingly faster catalytic action than the larger converter 44.

When an indication of exhaust gas temperature is below a predetermined temperature, controller 10 enables flow of exhaust gases first through converter 50 and subsequently through converter 44 by activating signal bpvc2, which is electrically connected to valve 52, and deactivating signal bpvc1, which is electrically connected to valve 48. Conversely, when the indication of exhaust gas temperature is above the predetermined temperature, controller 10 disables flow of exhaust gases through converter 50 by deactivating signal bpvc2, and enables flow of exhaust gases directly into converter 44 by activating signal bpvc1. In this particular example, the indication of exhaust gas temperature is inferred from engine coolant temperature T.

Conventional exhaust gas oxygen sensor 54 is shown coupled to exhaust manifold 46 upstream of valve 48 and valve 52. The voltage output of sensor 54 is compared to a reference value associated with stoichiometry in comparator 56 for providing output signal EGO1S to controller 10. Signal EGO1S is a two-state signal which is a predetermined high voltage when exhaust gases are rich of stoichiometry and a predetermined low voltage when exhaust gases are lean of stoichiometry.

Another conventional exhaust gas oxygen sensor (58) is shown coupled to the inlet of converter 44 downstream of valve 48 and converter 50. Its output voltage is also compared to a reference value associated with stoichiometry in comparator 60 for providing two-state output signal EGO2S to controller 10. Still another conventional exhaust gas oxygen sensor (62) is shown coupled to the engine exhaust downstream of converter 44. The output voltage of sensor 62 is compared to a reference value associated with stoichiometry in comparator 64 for providing two-state output signal EGO3S to controller 10.

Continuing with FIG. 1, intake manifold 68 of engine 28 is shown coupled to throttle body 70 having primary throttle plate 72 positioned therein. Throttle body 70 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Figure 2:
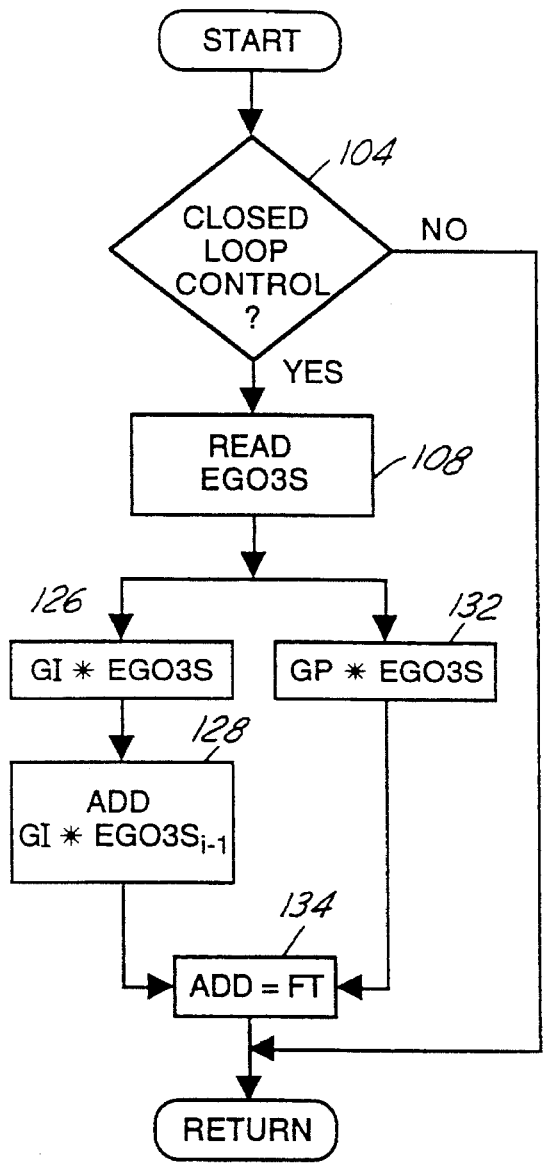
FIG. 2 is a high level flowchart of various operations performed by a portion of the embodiment shown in FIG. 1.

Referring now to FIG. 2, a flowchart of a routine performed by controller 10 to generate fuel trim signal FT is now described. A determination is first made whether closed-loop air/fuel control is to be commenced (step 104) by monitoring engine operation conditions such as temperature. When closed-loop control commences, signal EGO3S is read from comparator 64 step 108) and subsequently processed in a proportional plus integral controller as now described. During step 126, signal EGO3S is multiplied by gain constant GI and the resulting product added to products previously accumulated (GI * EGO3S$_{i-1}$) in step 128. Stated another way, signal EGO3S is integrated each sample period (i) in steps determined by gain constant GI. During step 132, signal EGO3S is also multiplied by proportional gain GP. The integral value from step 128 is added to the proportional value from step 132 during addition step 134 to generate fuel trim signal FT.

Figure 3:
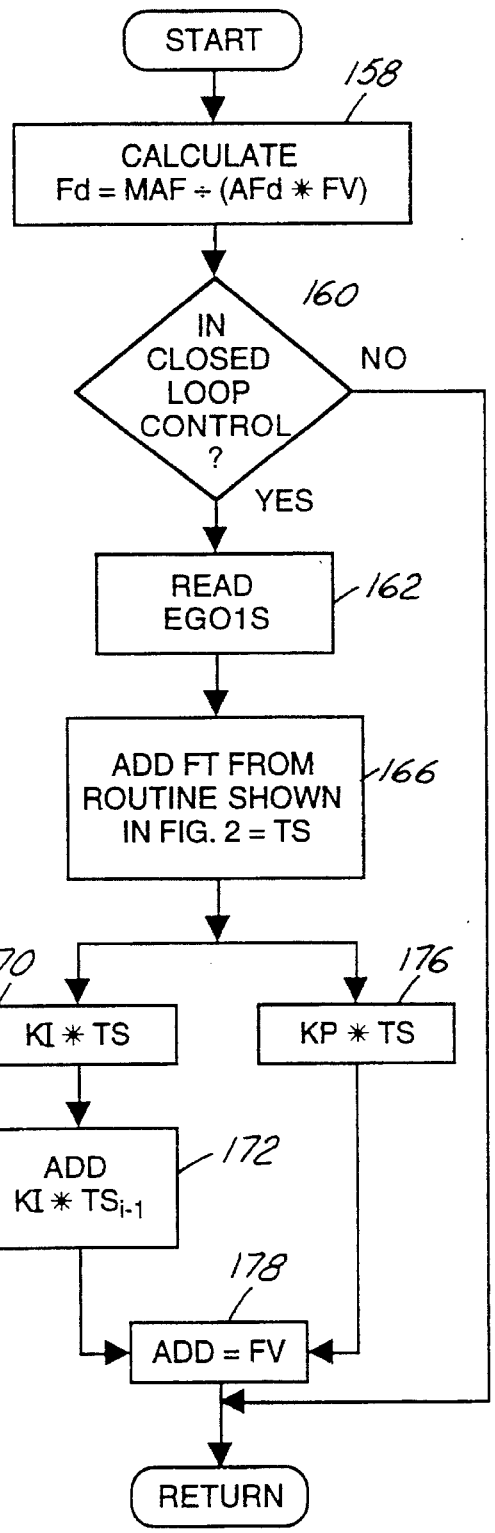
FIG. 3 is a high level flowchart of various operations performed by a portion of the embodiment shown in FIG. 1.

The routine executed by controller 10 to generate the desired quantity of liquid fuel delivered to engine 28 and trimming this desired fuel quantity by a feedback variable related both to sensor 54 and fuel trim signal FT is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV. After determining that closed-loop control is desired (step 160) by monitoring engine operating conditions such as temperature (T), signal EGO1S is read during step 162. During step 166, fuel trim signal FT is transferred from the routine previously described with reference to FIG. 2 and added to signal EGO1S to generate trim signal TS.

During steps 170–178, a conventional proportional plus integral feedback routine is executed with trimmed signal TS as the input. Trim signal TS is first multiplied by integral gain value KI (step 170), and the resulting product added to the previously accumulated products (step 172). That is, trim signal TS is integrated in steps determined by gain constant KI each sample period (i) during step 172. A product of proportional gain KP times trimmed signal TS (step 176) is then added to the integration of KI * TS during step 178 to generate feedback variable FV.

Figure 4A:
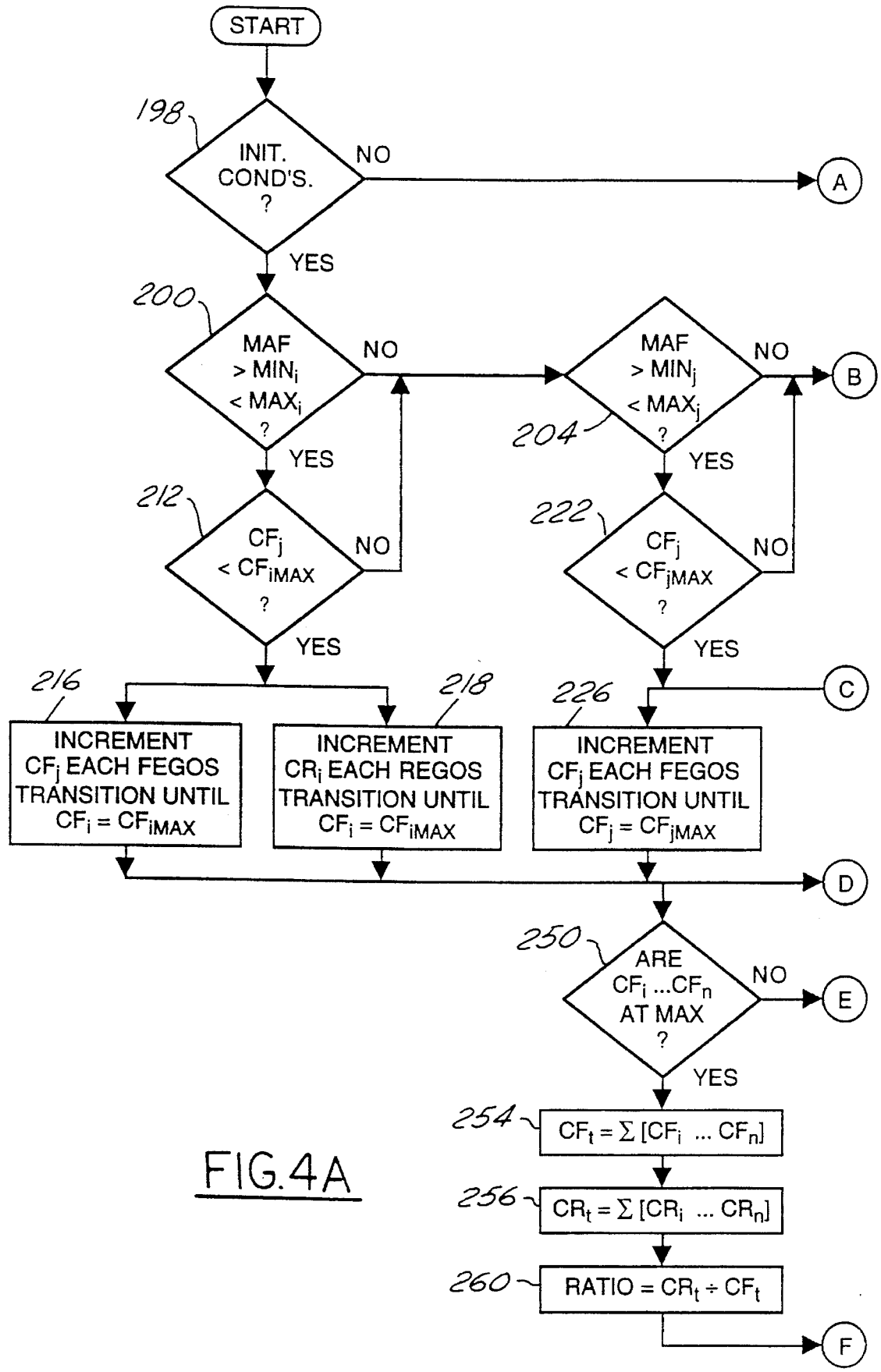
FIGS. 4A–4B are high level flowcharts of various operations performed by a portion of the embodiment shown in FIG. 1.
Figure 4B:
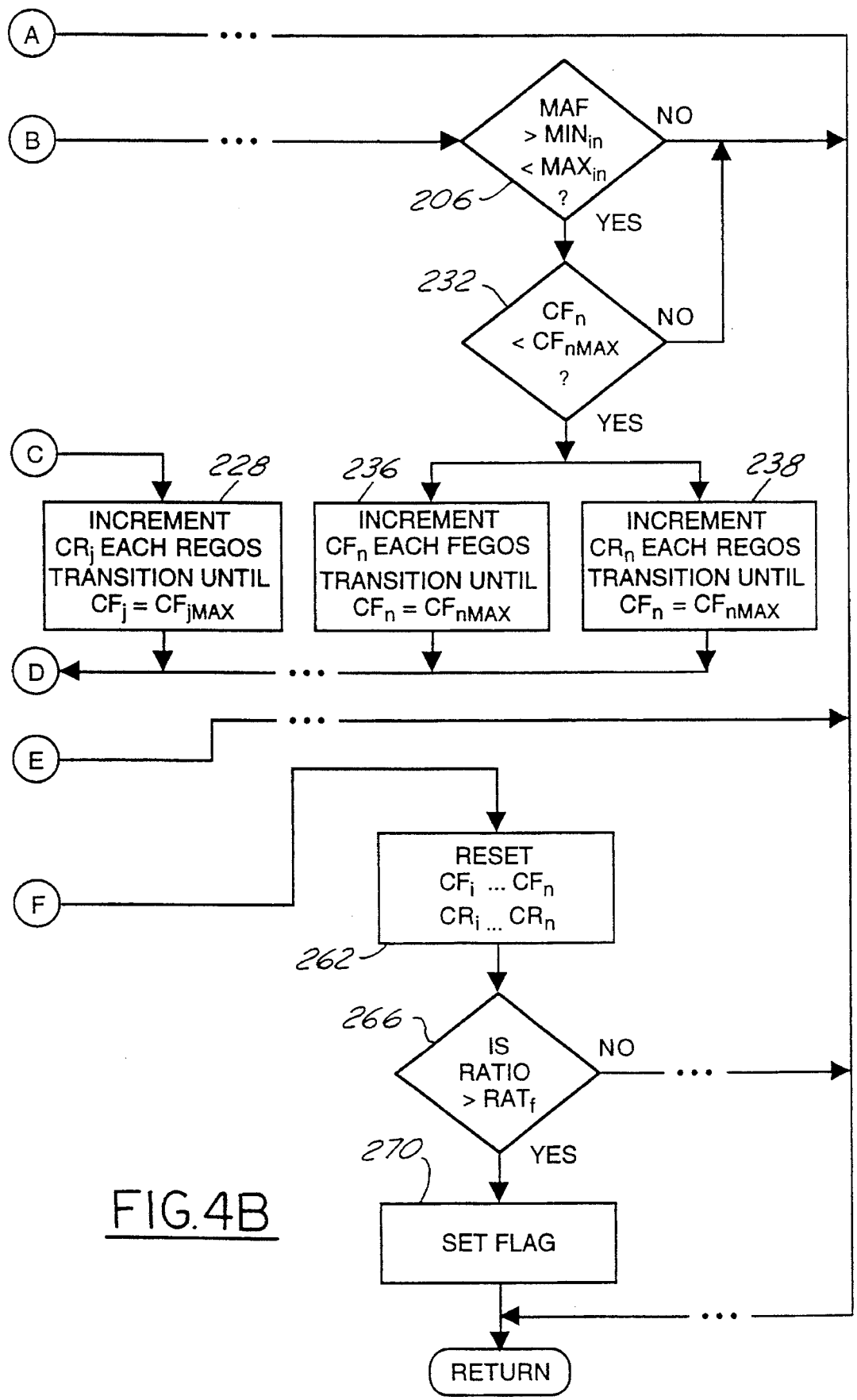

An example of testing converter efficiency is now described with particular reference to the flowchart shown in FIGS. 4A–4B. The subroutine described herein is used to test the efficiency of either converter 44 or converter 50. When converter 44 is being tested, signal FEGO is set to signal EGO2S and signal REGO is set to signal EGO3S. Similarly, then the efficiency of converter 50 is being tested, signal FEGO is set to signal EGO1S and signal REGO is set to signal EGO2S.

Initial engine conditions are checked before entering the test cycle described below (step 198). In this example, initial engine conditions are engine temperature (T) within a predetermined range; a predetermined time should have elapsed since the engine was started, and the closed-loop air/fuel control should have been operable for preselected time. During steps 200, 204, and 206, the inducted airflow range in which engine 28 operating is determined. These ranges are described as range (i) . . . range (n) for this example wherein "n" inducted airflow ranges are used to advantage.

Assuming engine operation is within airflow range (i), transitions between states of signal FEGOS are counted to generate count signal $CF_i$. This count is compared to maximum count $CF_{max}$ during step 212. While engine operation remains within airflow range (i), a test period of predetermined duration is generated by incrementing count $CF_i$ each transition of signal FEGOS until count $CF_i$ is equal to maximum count $CF_{max}$ (step 216). During this test period (i), count $CR_i$ is incremented each transition of signal REGOS (step 218). Stated another way, count $CR_i$ is incremented each transition of signal REGOS until count $CF_i = CF_{max}$.

When engine operation is within airflow range (j) as shown in step 204, predetermined period (j), count $CF_j$, and count $CR_j$ are determined in steps 222, 226, and 228 in a manner similar to that described above for airflow range (i) with respect to steps 212, 216, and 218. Each transition in signal FEGOS, count $CF_j$ is incremented until it reaches maximum count $CF_{jmax}$ (step 222). Predetermined test period (j) is thereby defined. During test period (j), count $CR_j$ is increment each transition of signal REGOS (step 228).

The above described operation occurs for each airflow range. For example, when engine 28 is operating within airflow range (n) as shown in step 206, test period (n), count $CF_n$, and count $CR_n$ are generated as shown in steps 232, 236, and 238.

During step 250, a determination is made as to whether engine 28 has operated in all airflow ranges (i $\cdots$ n) for the respective test periods (i . . . n). Stated another way, step 250 determines when each count of transitions in signal FEGOS ($CF_i$, $CF_j$, . . . $CF_n$) have reached their respective maximum values ($CF_{imax}$, $Cf_{jmax}$, . . . $CF_{nmax}$).

Each count ($CF_i$ . . . $CF_n$) of transitions in signal FEGOS for respective test periods (i $\cdots$ n) are summed in step 254 to generate total count $CF_t$. For reasons described above, the same total count $CF_t$ may be obtained by summing each maximum count ($CF_{imax}$ . . . $CF_{nmax}$) for respective test periods (i . . . n).

Total count $CR_t$ is generated in step 256 by summing each count ($CR_i$ . . . $CR_n$) for respective test periods (i . . . n). A ratio of total count $CR_t$ to total count $CF_t$ is then calculated during step 260 and all counts subsequently reset in step 262. If the calculated ratio is greater than a preselected reference ratio ($RAT_f$) a flag is set (steps 266 and 270) indicating that converter efficiency has degraded below a preselected limit.

Figure 5:
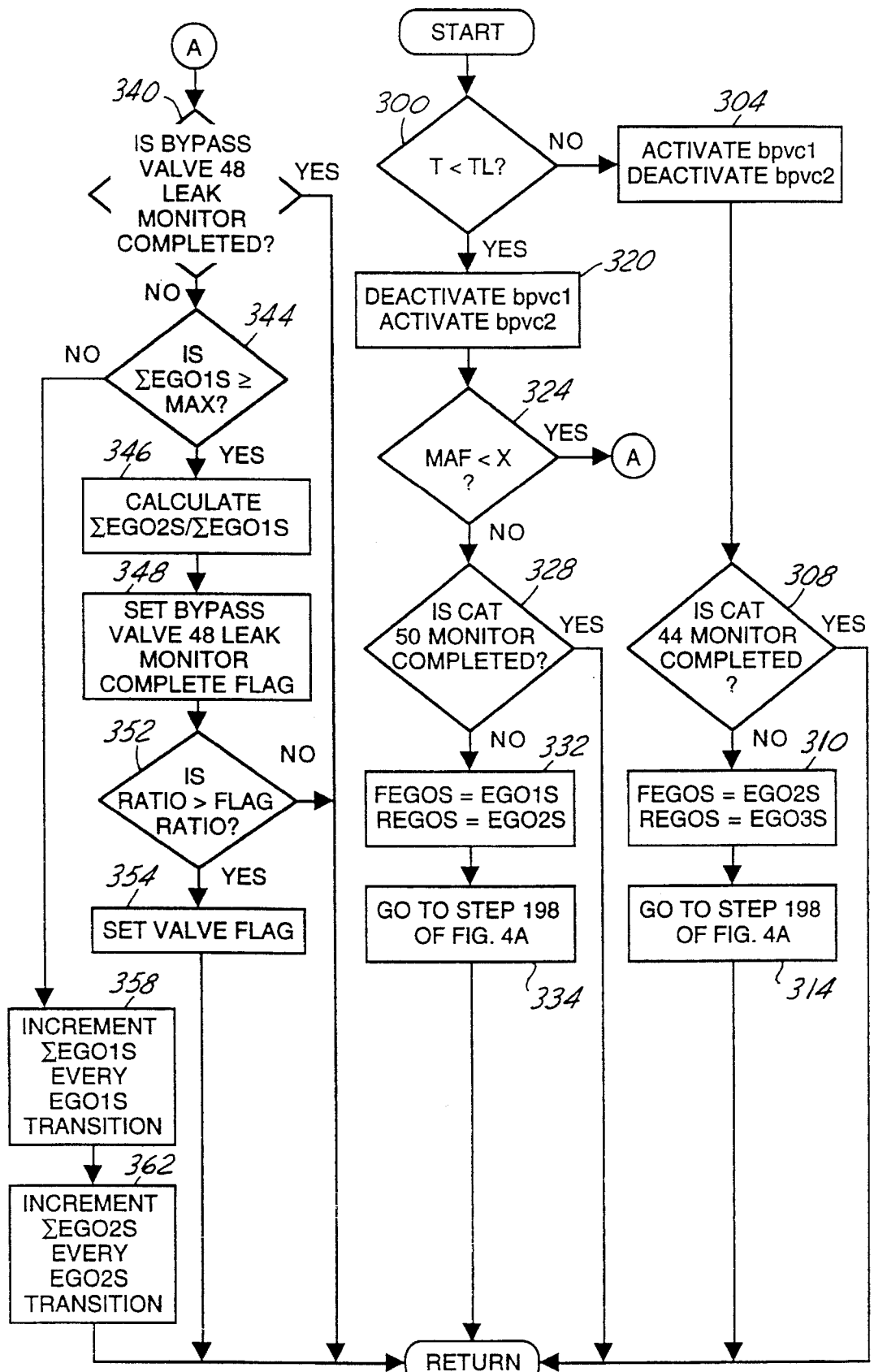
FIG. 5 is a high level flowchart of various operations performed by a portion of the embodiment shown in FIG. 1.

Referring now to FIG. 5, the subroutine for monitoring catalytic converter 44, catalytic converter 50, and bypass valve 48 are now described. When engine coolant temperature (T) is greater than lower limit temperature TL (300), controller 10 activates signal bpvc1 and deactivates signal bpvc2. Exhaust gases are thereby coupled to catalytic converter 44 via valve 48 and converter 50 is bypassed via valve 52. If the efficiency monitor of catalytic converter 44 is not completed (step 308), signal FEGOS is set equal to signal EGO2S and signal REGOS is set equal to signal EGO3S (310). Step 198 of the converter efficiency monitor routine provided in FIGS. 4A–4B is then entered during step 314.

When engine coolant temperature is less than lower limit temperature TL (300), controller 10 deactivates signal bpvc1 and activates signal bpvc2 (320). Exhaust gases are thereby routed through catalytic converter 50 before being routed through catalytic converter 44. The efficiency of catalytic converter 50 is then checked provided that airflow inducted into engine 28 (MAF) is greater than a predetermined value (324). If the efficiency monitor of converter 50 has not been completed (328), signal FEGOS is set equal to signal EGO1S, and signal REGOS is set equal to signal EGO2S (332). Step 198 of FIG. 4A is then entered to monitor the efficiency of converter 50 (334).

When gas flow through converter 50 is enabled (320), and inducted airflow (MAF) is less than a predetermined value (324), bypass valve 48 is monitored to determine whether there is any gas leakage during the following steps. If the leakage monitoring is not completed (340), and the summation of transitions in signal EGO1S have reached its maximum value (344), the ratio of transitions of signal EGO2S to signal EGO1S is computed in step 346. The bypass valve test complete flag is set during step 348 and the flag ratio set during 352 if the ratio calculated during step 346 is greater than a preselected ratio indicative of a gas leak through valve 48 (352, 354).

If the count in transitions of signal EGO1S has not reached a maximum value (344), the routine continues by summing transitions in signal EGO1S (358) and summing transitions in signal EGO2S (362).

An example of operation has been presented wherein sensors 54, 58, and 62 are two-state exhaust gas oxygen sensors. The invention claimed herein, however, may be used to advantage with other sensors such as proportional sensors. Other modifications will become apparent to those skilled in the art without departing from the spirit and scope of the invention claimed herein. Accordingly, the inventor herein intends that the invention be defined only by the following claims.

We claim:

1. A control method for engine exhaust gas purification and monitoring, comprising the steps of:

enabling flow of the exhaust gas through a first catalytic converter via a valve when an indication of exhaust gas temperature is above a predetermined temperature and enabling flow of the exhaust gas through a second catalytic converter when the exhaust gas temperature is below the predetermined temperature;

deriving an indicating signal from transitions in output of an exhaust gas oxygen sensor positioned downstream of the second converter;

indicating degraded operation of the second converter when both the indicating signal indicates degraded operation and an indication of airflow inducted into the engine exceeds a preselected airflow; and indicating degraded performance of the valve when said indicating signal indicates degraded operation and said indication of inducted airflow is below the preselected airflow.

2. The control method recited in claim 1 wherein said indicating signal is derived from a ratio of said sensor transitions to transitions in output of an upstream sensor positioned upstream of second converter.

3. The method recited in claim 2 wherein said indicating signal indicates degraded operation when said ratio exceeds a preselected ratio.

4. A control method for engine exhaust gas purification and monitoring, comprising the steps of:

enabling flow of the exhaust gas through a first catalytic converter via a first valve when an indication of exhaust gas temperature is above a predetermined temperature and enabling flow of the exhaust gas through a second catalytic converter when said exhaust gas temperature is below said predetermined temperature;

providing a first ratio of transitions in outputs of exhaust gas oxygen sensors respectively positioned downstream and upstream of said first converter during said enablement of said first converter;

providing a second ratio of transitions in outputs of exhaust gas oxygen sensors respectively positioned downstream and upstream of said second converter during said enablement of said second converter;

indicating degraded operation of said first converter during a test cycle when said first ratio exceeds a first preselected ratio and indicating degraded operation of said second converter when both said second ratio exceeds a second preselected ratio and an indication of airflow inducted into the engine exceeds a preselected airflow; and indicating degraded performance of said valve when both said second ratio exceeds a second preselected ratio and an indication of airflow inducted into the engine is below said preselected airflow.

5. The control method recited in claim 4 further comprising the steps of delivering a flow of fuel to the engine in proportion a measurement of said airflow inducted into the engine and adjusting said flow of fuel in response to a feedback variable derived from said sensor upstream of said first converter.

6. The method recited in claim 5 further comprising the step of correcting said feedback variable in response to a correction signal derived from said sensor downstream of said first converter.

7. The control method recited in claim 4 wherein said test cycle is provided by determining when the engine has completed operation within each of a plurality of inducted airflow ranges for at least a minimum duration in each of said airflow ranges.

8. The control method recited in claim 7 further comprising the step of generating each of said minimum durations by determining when a preselected number of transitions from a first state to a second state has occurred in an exhaust gas oxygen sensor positioned upstream of the converter while the engine is operating in one of said airflow ranges.

9. An engine exhaust purification and monitoring system, comprising:

a first catalytic converter having an inlet coupled to the engine exhaust via a first electronically controlled valve;

a second catalytic converter coupled to the engine exhaust via a second electronically controlled valve, said second catalytic converter having an outlet coupled to said first catalytic converter inlet downstream of said first valve;

a first exhaust gas oxygen sensor coupled to the engine exhaust upstream of both said first converter and said second converter;

a second exhaust gas oxygen sensor coupled to said second converter outlet;

a third exhaust gas oxygen sensor coupled to an outlet of said first converter;

a controller for enabling said second converter by closing said first valve and opening said second valve when an indication of exhaust gas temperature is below a predetermined value, said controller enabling said first converter by opening said first valve and closing said second valve when said exhaust gas temperature indication exceeds said predetermined value; and a monitor for providing an indication of degraded operation of said first converter from a ratio of transitions in output of said third sensor to said first sensor while said first converter is enabled, said monitor providing an indication of degraded operation of said second converter from a ratio of transitions in output of said second sensor to said first sensor while said second converter is enabled.

10. The system recited in claim 9 wherein said monitor provides a degraded performance indication of said second valve when said second converter is enabled and airflow inducted into the engine is below a preselected value and an activity indication derived from said second sensor output transitions are above a predetermined value.

11. The system recited in claim 9 wherein said monitor provides said indication of degraded operation while inducted airflow into the engine is above a preselected value.

12. An electronic storage device containing a computer program to be executed by an engine controller which controls and monitors engine operation, comprising:

enablement means for enabling flow of engine exhaust gas through a first catalytic converter via a valve when an indication of exhaust gas temperature is above a predetermined temperature and enabling flow of said exhaust gas through a second catalytic converter when said exhaust gas temperature is below the predetermined temperature;

signal indicating means for deriving an indicating signal from transitions in output of an exhaust gas oxygen sensor positioned downstream of said second converter;

converter indicating means for indicating degraded operation of said second converter when both said indicating signal indicates degraded operation and an indication of airflow inducted into the engine exceeds a preselected airflow; and valve indicating means for indicating degraded performance of said valve when both said indicating signal indicates degraded operation and an indication of inducted airflow is below said preselected airflow.

\* \* \* \* \*